Patented Nov. 10, 1936

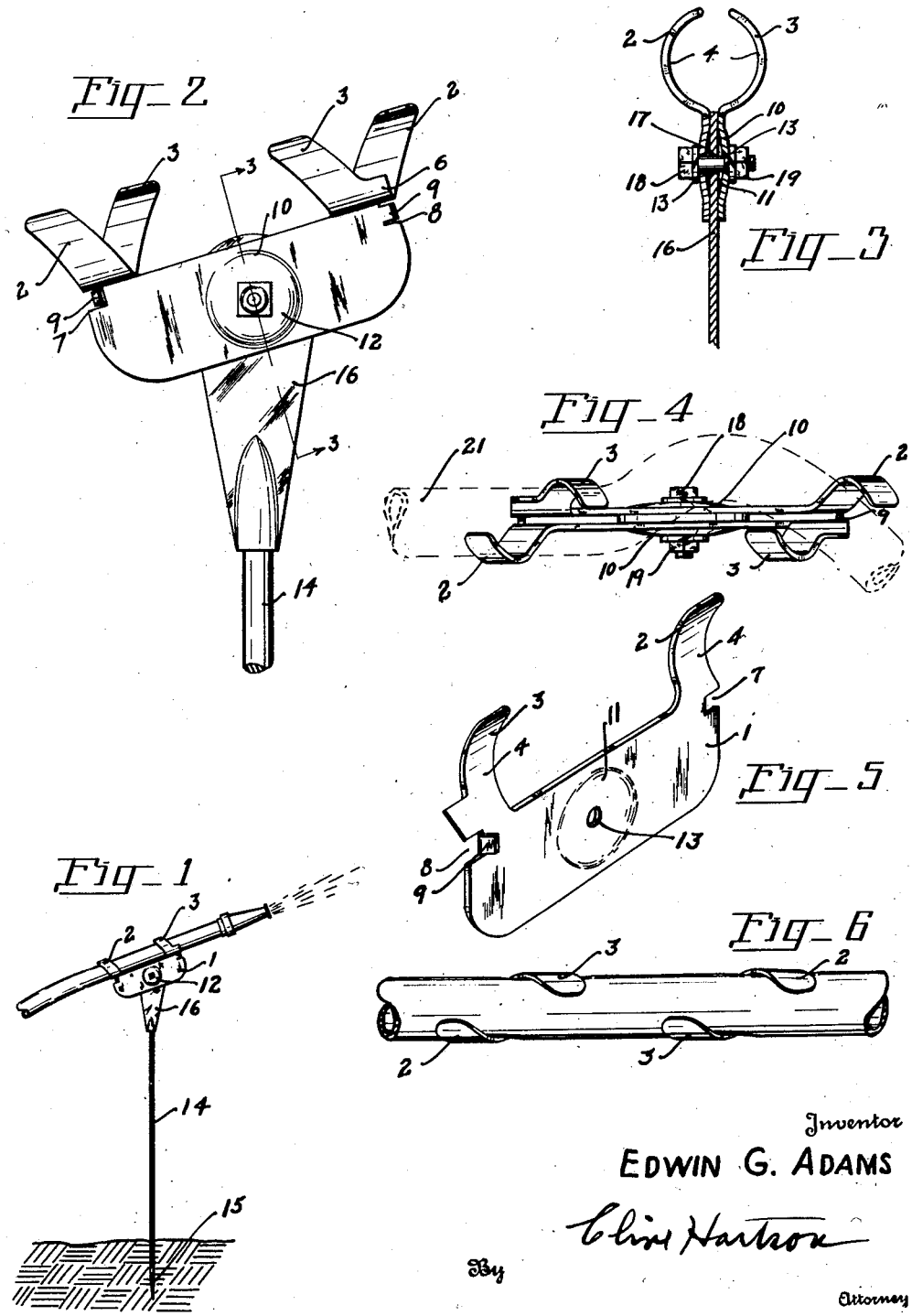

2,060,390

UNITED STATES PATENT OFFICE 2,060,390

HOSE SUPPORT

Edwin G. Adams, The Dalles, Oreg.

Application November 2, 1935, Serial No. 48,032

2 Claims. (Cl. 248—88)

My invention relates to a device for supporting garden hose in a position for sprinkling lawns and other vegetation. The invention consists of a pair of alike plates each provided with curved ears between which the hose is positioned and a support member to which the plates are attached. The support member is provided with a ground penetrating point for positioning it in an upright position. The ears are arranged so that when the hose is twisted it may be inserted between such bars, but after it has been straightened out it is held securely thereby.

In the drawing, Figure 1 is a perspective of the invention.

Figure 2 is a side elevation of the hose support member and of the upper portion of the stand.

Figure 3 is the sectional view indicated by section line 3—3 in Figure 2.

Figure 4 is a plan of the support member and illustrates the manner in which the hose is inserted therein.

Figure 5 is a perspective of one of the support plates comprising the gripping member.

Figure 6 is a plan view of the support member. This view shows a hose being held by such means.

In the drawing, the numeral 1 indicates an elongated plate. Projecting from the upper edge of such plate are the two ears 2 and 3. These ears are arranged one at one end of the plate and the other at the opposite end. Both ears are obliquely positioned with regard to the plate and both are inclined in the same direction. From top to bottom the ears are curved, thus providing upon the inner faces the concave hose seats 4. Ear 3 has a basal extension 6 which serves as will presently appear as a hose rest. At the ends of the plate 1 are the punched out slots 7 and 8 respectively. In punching out slot 8 the material composing the plate is bent at an angle, thus forming a lug 9. Centrally of the plate 1 is a bulge 10 formed by providing a concave inner surface 11 and a convex outer surface 12, and centered in the bulge is an aperture 13.

In conjunction with the plate just described, there is employed a support member consisting of a rod 14 having a ground penetrating point 15 whereby it may be inserted in the ground and held in an upright position. The upper end of the rod terminates in a flat head 16 of an inverted pear shape outline. Penetrating the head is an aperture 17.

Two plates 1 are employed for supporting a hose. For this purpose they are mounted one each side of the head 16, the apertures 13 in line with the aperture 17 of the head, and the concavity 11 facing such head. A bolt 18 and nut 19 together with washers secure the plates to the head, the apertures 13 and 17 receiving such bolt. The lug 9 of one plate seats in the slot 7 of the other. Bulges 10 are somewhat yieldable as the nut 19 is threaded upon bolt 18 allowing the plates to be fastened securely but not too rigidly to head 16. This allows the plates to be rocked to a desired angle upon the head.

Figure 4 illustrates how the hose 21 indicated by a dash line is placed between the ears 2 and 3 of the respective plates which constitutes the hose gripping member. The hose is inserted between two ears 2 and 3 first by holding it at an angle to the planes of the plates 1. Thereafter as shown in Figure 4 it is kinked or bent somewhat to allow it to be inserted between the remaining two ears 2 and 3 of the complementary plates. After that it is straightened out as shown in Figure 6, the curvature of the ears securely holding it in place. The basal extensions 6 of ears 3 form a bottom support for the hose complementing the basal portion of the opposing ears 2.

Figure 1 shows the invention being employed for supporting a hose used for sprinkling purposes. The angle of the hose may be readily adjusted by rocking the plates 1 upon the bolt 18. The point 15 of the rod 14 allows the ready positioning of the support by merely inserting the point in the ground.

The plates 1 as before indicated are alike. These may be cheaply manufactured by stamping them from suitable metal plates. Parts have been reduced to a minimum, and such as there are are of simple construction.

While a specific form of the improvement has been described and illustrated herein, it is desired to be understood that the same may be varied, within the scope of the appended claims, without departing from the spirit of the invention.

Having described my invention, I claim—

1. In a hose support, a stand, a pair of alike elongated plates, a pair of curved ears projecting upwardly from each plate, means for mounting the plates in operative cooperation with one another, said ears being obliquely arranged with regard to their plates so that the ears of one plate incline in one direction and the ears of the other in the opposite direction, and the inclination of the ears serving to provide a space for the introduction of a hose to be held between the ears of one plate and the ears of the other plate.

2. In a hose support, a pair of alike plates, each plate having at one end a slot and at the other a lug, the lug of one fitting into the slot of the other when corresponding faces thereof are in opposition to each other, means for fastening the plates to a support member, each plate having a pair of oblique and curved ears, and the inclination of the ears providing a space for the introduction of a hose between the ears of one plate and the ears of the other.

EDWIN G. ADAMS.